Dec. 9, 1969     J. KLYSA, JR., ET AL     3,483,455

MALFUNCTION DETECTION CIRCUIT

Filed March 30, 1967

INVENTORS
JOHN KLYSA JR.
WILLIAM W. McCAMMON
BY

ATTORNEY

United States Patent Office 3,483,455
Patented Dec. 9, 1969

3,483,455
MALFUNCTION DETECTION CIRCUIT
John Klysa, Jr., Commack-Dix Hills, and William W. McCammon, Merrick, N.Y., assignors to Sperry Rand Corporation, a corporation of Delaware
Filed Mar. 30, 1967, Ser. No. 627,000
Int. Cl. H02p 1/54, 5/46; G05b 11/00
U.S. Cl. 318—18                                     4 Claims

ABSTRACT OF THE DISCLOSURE

In a gyroscopic platform a circuit for detecting failures which cause hardover operation of a pulse-width modulation controlled gimbal torque motor wherein by selective integration of bi-state or tri-state pulse-width modulated signals, any sustained or saturated signal in one direction will result in its integral signal exceeding a predetermined threshold whereby an alarm is given and torque motor energy is removed.

BACKGROUND OF THE INVENTION

In many control systems wherein a pulse-width modulated D.C. motor drives a load in response to an output of a control sensor, it is often necessary to provide protection against hardover failures of the motor control system which would cause the motor to drive the load hard against its stops and result in damage thereto. It is, therefore, desired to provide protection apparatus which detects such failures extremely rapidly and provide automatic removal of motor power as well as visual indication of such failure.

While failure detectors have been employed for this purpose in the past, they have been relatively complex and expensive and have involved careful adjustment of circuit parameters.

SUMMARY OF THE INVENTION

The present invention relates to a protection circuit for detecting failures which cause a hardover operation of a D.C. motor which is energized by pulse-width modulated signals. In a specific application the protection circuit is embodied in a gyroscope platform wherein pulse-width modulated signals control D.C. torque motors mounted on the platform gimbals and operate in response to the outputs of control gyroscopes carried by the platform. It is necessary to provide protection against hardover failures of the gimbal drive motor control systems which would cause the motor to drive the gimbals and their supported platform hard against their stops thereby resulting in damage to the platform and its sensitive gyroscopes.

Basically, the system consists of dual integrator networks which, in conjunction with the driving electronics, act to selectively integrate bi-state or tri-state pulse-width modulated signal. Should the pulse-width control circuits fail in a manner such that one integrator remains energized, its output will rapidly exceed a given threshold value and actuate a switching device which serves to remove the torque motor energization and provide a visual indication of such failure. One of the principle advantages of the protection circuit of the invention is its simplicity and hence its economy. Another advantage besides this is its speed of response which may be on the order of milliseconds in a millisecond pulse system. A further object resides in the fact that noise, that is, relatively high frequency spurious signals is not effectively integrated and nuisance disconnects are thereby avoided. The circuit is arranged such that during normal operation pulses of one sense or another drive the torque motor in one direction or another in accordance with the duration of the pulses. One of the integrating networks is responsive to pulses tending to drive the motor in one direction and the other integrator is responsive to the pulses tending to drive the motor in the opposite direction. The apparatus includes a circuit by means of which during normal operation, when pulses of one sense are applied to the motor and integrated by its corresponding integrating network, the other integrator is being rapidly discharged and vice versa. Should a failure occur in the driving electronics for the motor such as to produce a continuous pulse in one direction or the other, the associated integrator continues to build up a charge thereon and when this charge exceeds a predetermined value, a suitably biased trigger network operates an alarm removing excitation current to the motor and preferably providing a visual indication of such failure.

DESCRIPTION OF THE DRAWINGS

The present invention is illustrated in the single sheet of drawings wherein.

DESCRIPTION OF THE PREFERRED EMBODIMENT

Figure 1:
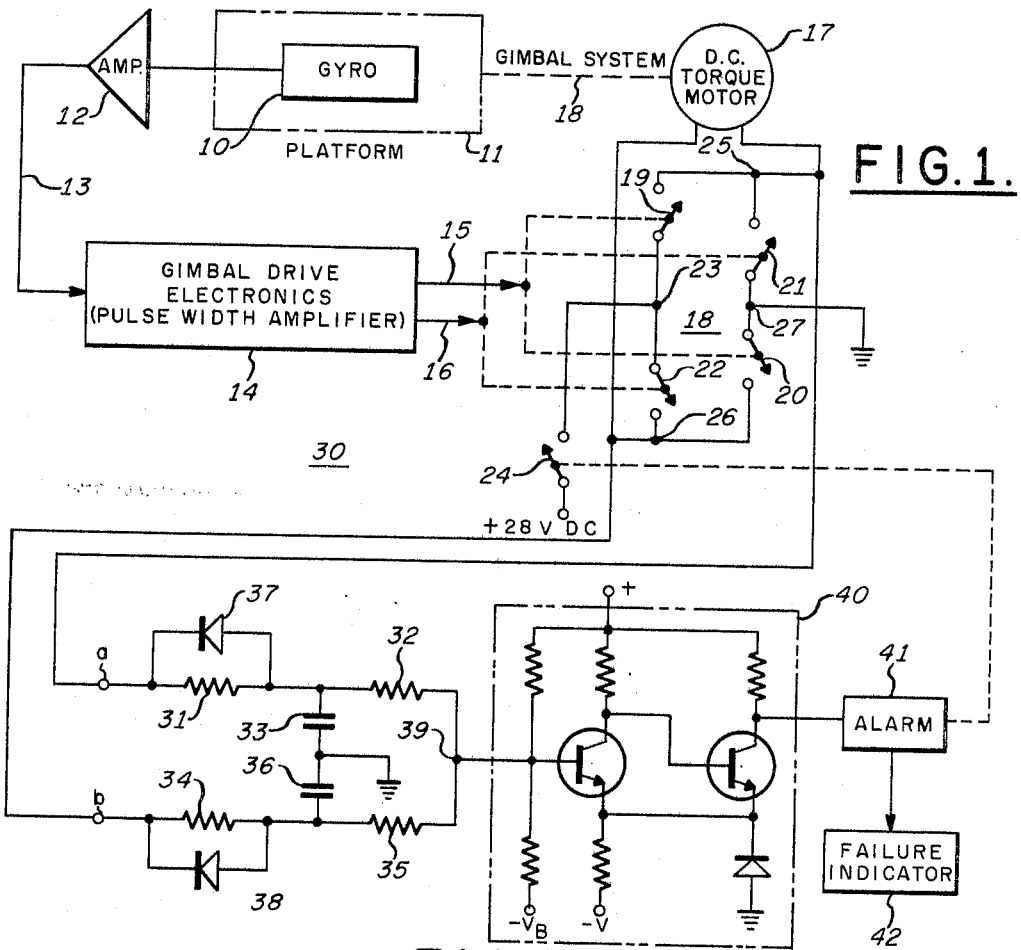
FIG. 1 is a schematic diagram illustrating the circuits for carrying out the invention.

Referring now to FIG. 1 of the drawing, there is illustrated very schematically one control axis of a gyroscopic platform. This platform may be of the type illustrated in U.S. Patent 2,771,779 or 3,266,325. However, it is to be understood that the invention may be employed at any system wherein a drive motor is energized in accordance with pulse-width modulated signals. For example, a servo motor for driving the control surface of an aircraft.

In the present illustrative embodiment, a control gyroscope 10 senses motion of its supporting platform 11 and provides an A.C. electric output of phase and amplitude dependent upon the direction and magnitude respectively of each motion which output is amplified in suitable amplifier 12 the output 13 of which is applied to the input of gimbal drive electronics 14. Basically, the gimbal drive electronics sees the phase sensitive output of the gyro pick off 10 and converts this output into pulses having substantially constant magnitude but varying length or duration as a function of the phase and magnitude of the pick off signal. Pulses of one sense are supplied on output 15 of pulse-width amplifier 14 while pulses of the other sense are supplied on output lead 16 thereof.

A D.C. torque motor 17 is mounted on the gimbal system 18 which in turn drives the platform 11 and hence gyro 10 in a sense and magnitude such as to tend to zero the output signal of the gyro. The operation of the torque motor 17 is controlled from the output of pulse-width amplifier 14 through a bridge network generally indicated at 18. Bridge network 18 comprises a first pair of switches 19 and 20 and a second pair of switches 21 and 22. Input junction 23 of the bridge is connected to receive 28 volts D.C. from a suitable power source through engage-disengage switch 24, and the opposite point 27 of bridge 18 is connected to ground. The outputs 25 and 26 of the bridge are connected to the torque motor energizing winding (not shown). Actuation of switches 19 and 20 is controlled in accordance with the output 15 of pulse amplifier 14 while actuation switches 21 and 22 is controlled from the output 16 thereof. It is evident, therefore, that the D.C. motor 17 will be alternately enenrgized in accordance with pulses of one sense or another and will rotate in one direction or the other depending upon the relative durations of these pulses. If there is no dwell time between the operation of the switches 19, 20 and 21, 22, the energization is termed bi-state; if there is a dwell, it is termed tri-state.

The foregoing apparatus is a generally conventional gyro-platform-gimbal follow-up servo loop, the operation of which will be readily understood by those skilled in the servo art.

As stated above, it is desired to protect the sensitive gyroscopic system against malfunctions which would produce hardover drive of the motor 17 resulting in possible damage to the platform and particularly to the sensitive gyroscope carried thereby. It is also desired to have the malfunction detected just as rapidly as possible and to remove energization of the torque motor 17.

The failure detection circiut for providing this protection is indicated generally by reference character 30. It consists of a pair of passive integrators comprising resistors 31, 32 and capacitor 33 and resistors 34, 35 and capacitor 36. The capacitors 33 and 36 have common terminals connected to ground. Diodes 37 and 38 are arranged in shunt with resistors 31 and 34 respectively while resistors 32 and 35 are connected to a common junction 39 which in turn is connected to a suitable biased threshold network, such as Schmitt trigger 40. The output of Schmitt trigger 40 is connected to an alarm circuit 41 which in turn operates to open bridge energization switch 24 and preferably a failure indicator 42.

Figure 2:
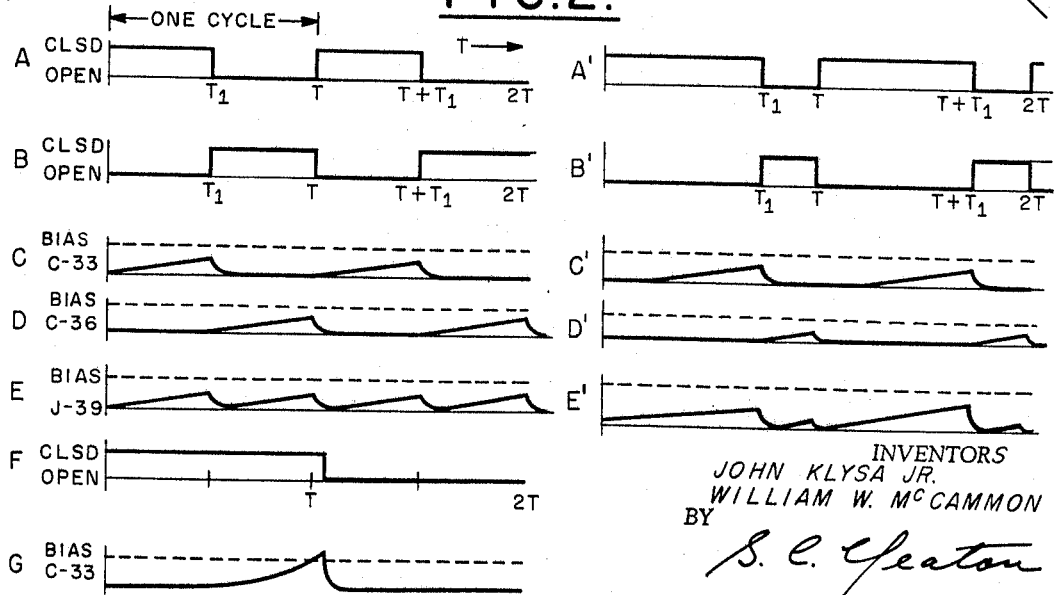
FIG. 2 shows a group of curves useful in understanding the operation of the invention.

The operation of the protection circuit will be described in connection with FIG. 2 of the drawing and the discussion will specifically relate to a bi-state switching bridge, but it will be readily apparent that it is equally applicable to a tri-state switching bridge as stated above. However, an advantage gained by using a bi-state cycle resides in the more rapid resetting of the integrators by the inductive kick of the motor load winding.

During normal operation of the pulse-width amplifier 14, switches 19 and 20 are closed for half of the cycle or period T; i.e. $T_1 = \frac{1}{2}T$ (curve A), while switches 21, 22 are open during the same period (curve B). In the remaining half period switches 21, 22 are closed and switches 19, 20 are open. Thus, the net torque produced by the torque motor is zero during the total period T. For this normal operation, the detection circuit 30 operates as follows. With switches 19 and 20 closed, point $a$ is positive and point $b$ is a ground potential and, therefore, capacitor 33 charges to a positive level through resistance 31 (curve C). With switches 19 and 20 open and switches 21 and 22 closed, point $a$ is connected to ground allowing capacitor 33 to discharge rapidly through diode 37 (curve C). The time constant of the discharge network is very short. However, the charging time constant is relatively long compared to the repetition period T and, therefore, the input to the Schmitt trigger 40 is insufficient to overcome the bias $-V_B$ applied thereto and the trigger does not fire. Exactly the same operation occurs for the other half of the dual integrators (curves B and D). Thus, during neither half of the cycle is the input to the Schmitt trigger 40 sufficient to overcome the bias $-V_B$ applied thereto and the trigger does not fire (curve E).

The above circuit operation is applicable over the complete operating range of torquer excitation control, i.e. for $T_1$ less than T (curves A', B', C', D', E'). However, in the event that a failure occurs in the driving electronics 14 and one of the outputs 15 or 16 is driven hardover with $T_1$ equal to zero or equal to or slightly greater than T (curve F), one or the other of the integrating capacitors 33, 36 is permitted to continue to charge until the voltage level at 39 is adequate to overcome the bias $-V_B$ of Schmitt trigger 40 and thereby excite the alarm 41 (curve G).

From the foregoing it will be evident that a very simple protection circuit is provided; one that is immune to high frequency system noise, one that is responsive over the complete dynamic range of normal operation with the driving electronics, and one wherein a diode is provided to ensure a rapid discharge of the integrating capacitors used in conjunction with the driving electronics and motor switch bridge.

While the invention has been described in its preferred embodiments, it is to be understood that the words which have been used are words of description rather than limitation and that changes within the purview of the appended claims may be made without departing from the true scope and spirit of the invention in its broader aspects.

We claim:
1. Malfunction detection apparatus for a pulse-width modulation controled D.C. motor wherein said motor energization is controlled in accordance with pulses of one sensor or another and having durations respectively dependent upon the desired direction and magnitude of operation of said motor, said apparatus comprising:
   first and second integrator means responsive respectively to said pulses for providing first and second outputs having magnitudes respectively proportional to the duration of said pulses,
   said first and second integrating means include first and second condensers respectively each having one terminal connected to ground and another terminal connected to receive said pulses,
   resistor and diode means connected in parallel with each of said resistor means and adapted to discharge one of said condensers while the other is charging and vice versa, and
   detector means responsive to said outputs for providing a warning signal when the magnitude of at least one of said outputs exceeds a predetermined value.

2. The apparatus as set forth in claim 1 wherein said detector means comprises means combining said integrator outputs and biased conductive means responsive to said combined outputs and adapted to conduct upon at least one of said outputs exceeding said bias.

3. The apparatus as set forth in claim 2 wherein said biased conductive means comprises a biased Schmitt trigger.

4. The apparatus as set forth in claim 2 further including means responsive to the output of said conductive means for removing said motor energization.

References Cited
UNITED STATES PATENTS

| | | | |
|---|---|---|---|
| 2,649,563 | 8/1953 | Meredith | 318—489 |
| 3,229,270 | 1/1966 | Rosenblatt | 318—24 XR |
| 3,356,921 | 12/1967 | Bradford et al. | 318—19 XR |
| 3,374,413 | 3/1968 | Dornberger et al. | 318—341 |

B. DOBECK, Primary Examiner

U.S. Cl. X.R.

318—28, 490; 340—419